Aug. 13, 1929.  J. S. THOMPSON  1,724,053

FRICTION BRAKE

Filed May 1, 1926

Inventor
James S. Thompson
By Wm O Bell Atty.

Patented Aug. 13, 1929.

1,724,053

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed May 1, 1926. Serial No. 105,897.

This invention relates to friction brakes and while it is particularly adapted for expanding brakes arranged to make friction contact with a drum, which is a form of brake commonly employed in automotive vehicles, it is also useful in many other installations as will be apparent to those skilled in the art.

The object of the invention is to provide an internal expanding brake of novel construction and embodying a removable friction shoe and simple means for securing said shoe in operative position.

A further object of the invention is to provide an internal expanding brake comprising a pivoted head and a detachable friction shoe with means for securing the friction shoe in fixed position on the head.

And a further object of the invention is to provide clamps for engaging a friction shoe with a brake head and radially disposed bolts for securing said clamps to the head.

In the accompanying drawings illustrating a selected embodiment of the invention which I have found satisfactory in commercial test, Fig. 1 is a sectional elevation of parts of a brake assembly showing my invention applied thereto.

Figure 1:
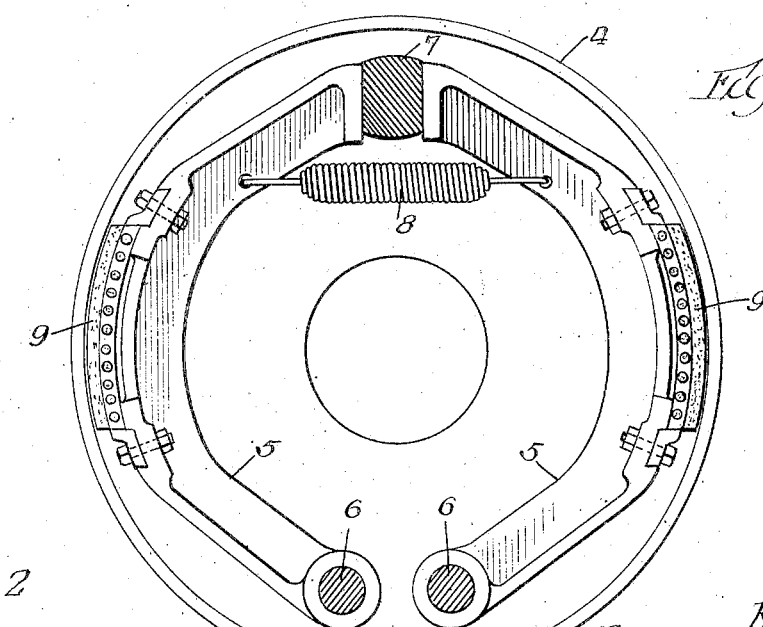

Referring to the drawing 4 is the brake drum, 5, 5 are the brake heads which are pivotally mounted on the studs 6, 6 and are adapted to be operated by the cam 7 and the spring 8 to move the friction shoes 9, 9 into and out of operative contact with the drum. The construction of the drum, the manner of mounting the brake heads and the mechanism for operating the brake heads are not involved in this invention, and the invention can be embodied in brake assemblies of different kinds.

The head comprises a comparatively narrow arm substantially T shaped in cross section, and enlarged laterally at 10 to provide shoulders 11 which are spaced apart lengthwise of the arm to engage the back of the shoe at the ends thereof. The shoe is free from engagement with the head except at the shoulders and this provides for ventilation at the back of the shoe. For some purposes it may be desirable that the back of the shoe should contact with the head throughout its area in which case the shoulders 11 would continue in effect to form a single continuous shoulder or seat extending from end to end of the shoe.

Figure 2:
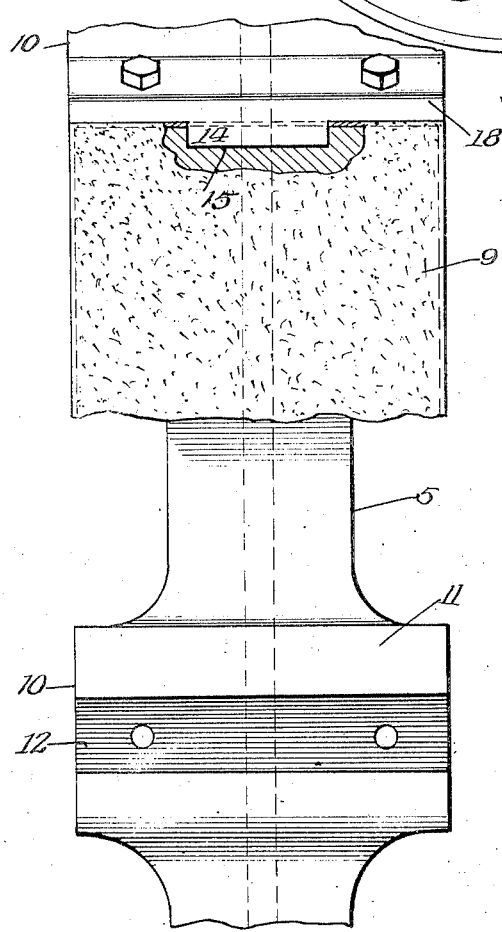
Fig. 2 is an enlarged plan view, partly in section, showing a part of the shoe broken away to disclose the seat on the brake head.
Figure 3:
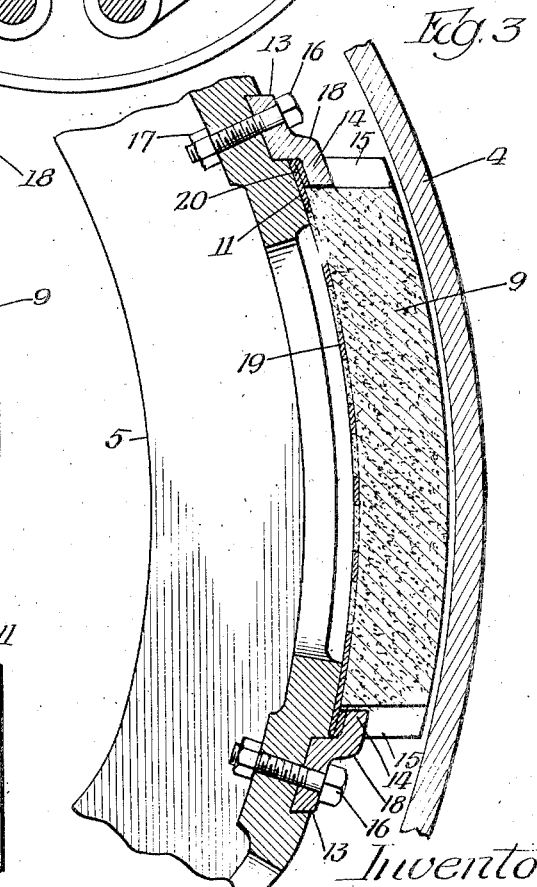
Fig. 3 is a sectional view of the parts shown in Fig. 2.

The enlarged portions 10 of the arm are provided with transverse slots 12 which may extend throughout said enlarged portions as shown in Fig. 2. Clamps 13 are shaped to seat in said slots and they are provided with projections 14 which engage recesses 15 in the shoe. The projections preferably make a comparatively snug fit in the recesses and these projections and recesses are preferably located midway between the ends of the clamp and sides of the shoe respectively. The side walls of the slots and the sides of the clamps are parallel and the parts proportioned so that the clamps will fit snugly in the slots. These clamps are secured to the head by bolts 16 which are disposed radially through the clamps and the head and are held by nuts 17.

I have found this construction and arrangement of parts desirable for embodying my invention in an internal automotive brake assembly. The shoes can be easily installed upon the heads and replaced as required. I prefer to locate the shoes approximately midway between the ends of the heads so that the two shoes will be substantially diametrically opposed with the drum. The clamps are engaged with the head on parallel lines and the bolts are engaged with the clamps and the head on radial lines; and the bolts are of greater length than the maximum operative distance between the head and the rim of the drum. If the nuts should work loose or if they should not be applied to the bolts the latter will hold the clamps in place in their slot seats in the head and the clamps will hold the shoe in its proper position on the head at all times, because the bolts cannot be removed from the heads or become displaced from the heads when the head is in operative position in the drum. The friction engagement between the clamps and the bolts and the clamps and the shoe and the manner in which the clamps are seated in the head and the arrangement of the bolts in the clamps and the head will prevent the bolts from becoming displaced during service of the brake. When the brake is out of service a bolt from which the nut has been removed will not fall out by gravity because its head will engage the rim of the drum and hold the bolt. I propose, of course, to provide the bolts with nuts, and also with lock nuts if it may be found desirable, but the construction is such that if through carelessness the nuts are not applied to the bolts or if the nuts work off the bolts no harm can result because the shoe will be held in proper position on its seat.

Shoulders 18 extend throughout the length of the clamps to provide end stops at the ends of the shoe throughout the width of the shoe. The projections 14 are of less length than the length of the clamps but they are sufficient to make operative engagement with the shoe for preventing outward movement of the shoe away from its seat and also for preventing sidewise movement of the shoe. There is not much tendency for the shoe to move outward or sidewise and therefore it is found that the projections are sufficient for the purpose. There is a tendency for the shoe to move lengthwise under application of the brake and for that reason substantial end stops are provided by the shoulders on the clamps. The shoe shown in the drawing is provided with a metal back 19 and the metal is folded upon itself to form a double thickness at 20 in the bottom of the recesses 15 to be engaged by the projections 14.

I am aware that changes in the form, construction and arrangement of parts of my invention will be made to adapt it for different installations and to meet different conditions and I reserve the right to make all such changes as fall within the scope of the following claims.

I claim:

1. In a friction brake, a brake head having a shoe seat thereon and transverse slots with plane parallel side walls at the ends of said seat, clamps having parallel side walls and adapted to be seated in said slots, a friction shoe, said clamps comprising circumferentially-disposed projecting parts engaging the ends of the shoe to hold the shoe in place on the seat, and angularly disposed means for securing the clamps on the head.

2. In a friction brake, a brake head having a shoe seat thereon and transverse slots with plane parallel side walls at the ends of said seat, a friction shoe, clamps with parallel side walls seated in said slots and comprising circumferentially projecting parts engaging the ends of the shoe to hold the shoe in place on the seat, and fastening means disposed radially through the clamps and head at the slots for securing the clamps to the head.

3. In a friction brake, a brake head having a shoe seat thereon and transverse slots with parallel side walls at the ends of said seat, a friction shoe having recesses in its ends, clamps having parallel side walls and adapted to be seated in said slots and having projections to engage the recesses in the shoe and shoulders to engage the ends of the shoe to hold the shoe in place on the seat, and bolts passing radially through the clamps and the head for securing the clamps to the head.

4. An internal friction brake comprising a rim, a brake head arranged within the rim, a brake shoe seated on the head to engage the rim, transverse slots in the head at the ends of the shoe, clamps seated in said slots and comprising circumferentially projecting parts engaging the ends of the shoe to hold the shoe in place on the head, and radially disposed bolts passing through the clamps and the head at the slots for securing the clamps to the head, said bolts being of greater length than the maximum operative distance between the head and the rim.

JAMES S. THOMPSON.